United States Patent
Smithson et al.

(10) Patent No.: US 10,422,541 B2
(45) Date of Patent: Sep. 24, 2019

(54) SYSTEM AND METHOD FOR SWITCHING A MULTIPLE-ZONE HEAT PUMP REFRIGERANT SYSTEM BETWEEN COOLING AND HEATING MODES

(71) Applicant: Mitsubishi Electric Corporation, Tokyo (JP)

(72) Inventors: Matthew Smithson, Cypress, CA (US); Rodney Olson, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 15/475,302

(22) Filed: Mar. 31, 2017

(65) Prior Publication Data

US 2018/0283714 A1    Oct. 4, 2018

(51) Int. Cl.
| | |
|---|---|
| F24F 1/00 | (2019.01) |
| F24F 11/30 | (2018.01) |
| G05D 23/19 | (2006.01) |
| F24F 11/63 | (2018.01) |
| F24F 11/61 | (2018.01) |
| F24F 11/62 | (2018.01) |
| F24F 11/65 | (2018.01) |
| F24F 11/58 | (2018.01) |

(Continued)

(52) U.S. Cl.
CPC .............. *F24F 11/30* (2018.01); *F24F 11/61* (2018.01); *F24F 11/62* (2018.01); *F24F 11/63* (2018.01); *F24F 11/65* (2018.01); *G05D 23/1917* (2013.01); *F24F 11/56* (2018.01); *F24F 11/58* (2018.01); *F24F 11/66* (2018.01); *F24F 2110/10* (2018.01); *F24F 2221/54* (2013.01); *G05B 2219/2614* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 4,530,395 A | 7/1985 | Parker et al. | |
| 5,303,767 A * | 4/1994 | Riley ................... | F24F 3/044 |
| | | | 165/208 |

(Continued)

OTHER PUBLICATIONS

Daikin "Super Multi NX". (Excerpt only).

(Continued)

*Primary Examiner* — Mohammad Ali
*Assistant Examiner* — Vincent W Chang
(74) *Attorney, Agent, or Firm* — Posz Law Group, PLC

(57) ABSTRACT

A computer-implemented method of controlling an operational mode of an outdoor unit connected to a plurality of indoor units, the method including: determining an operational mode of an outdoor unit; determining, at a master decision unit, a target outdoor mode for the outdoor air-conditioning unit based on the priority, the current area mode, the current area temperature, and the set point for each of the indoor units, the maximum actual standby duration and the maximum allowable standby duration of each of the indoor units, and the minimum active duration and the current active duration for the outdoor unit; and systematically controlling the operational mode to become the target outdoor mode when the target outdoor mode is different from the operational mode.

21 Claims, 6 Drawing Sheets

(51) Int. Cl.
　　　*F24F 110/10*　　　(2018.01)
　　　*F24F 11/66*　　　(2018.01)
　　　*F24F 11/56*　　　(2018.01)

(56) References Cited

U.S. PATENT DOCUMENTS

| | | | |
|---|---|---|---|
| 5,860,473 | A | 1/1999 | Seiden |
| 6,453,993 | B1 | 9/2002 | Bujak, Jr. |
| 2006/0071089 | A1 | 4/2006 | Kates |
| 2007/0021872 | A1* | 1/2007 | Fisher ................ G05D 23/1934 700/277 |
| 2007/0057075 | A1 | 3/2007 | Votaw et al. |
| 2016/0187908 | A1* | 6/2016 | Cai ........................... G05F 1/66 700/276 |

OTHER PUBLICATIONS

Daikin "MXS Multi-Split Heat Pump Systems". (Excerpt only).
Daikin "Super Multi NX" Multi-Split Type Air Conditioners Brochure. Dec. 2014.
Daikin "MXS Multi-Split Heat Pump Systems" Brochure. 2013.

* cited by examiner

SYSTEM AND METHOD FOR SWITCHING A MULTIPLE-ZONE HEAT PUMP REFRIGERANT SYSTEM BETWEEN COOLING AND HEATING MODES

FIELD OF THE INVENTION

The present application is directed to a system and method by which a multiple-zone heat pump refrigerant system can be switched between a cooling mode and a heating mode. More particularly, it is directed to a system and method by which the mode of an outdoor unit can be switched without the need for all internal units to agree with the switch.

BACKGROUND OF THE INVENTION

A typical multiple-zone heat pump refrigerant system includes a single outdoor heat pump unit connected to multiple indoor units. The indoor units are often individually-controlled split-type heating/cooling units.

In many implementations, the outdoor heat pump unit may be limited to a single mode of operation. In other words, such an outdoor heat pump unit must be in either a heating mode or a cooling mode at any given time, but cannot be in both. The multiple indoor units can each have a different operational mode (i.e., heating or cooling), but need not all be in the same operational mode at the same time.

This means that in some situations, a subset of the connected indoor units may be in a heating mode, while a different subset of the indoor units may be in a cooling mode, with each indoor unit being only in a single mode (i.e., heating or cooling). In such a situation, the indoor units in the heating mode are requesting heating from the outdoor heat pump unit, while the indoor units in the cooling mode are requesting cooling from the outdoor heat pump unit. However, the typical multi-zone outdoor unit can only accommodate one set of requests. This is particularly common for multiple-zone systems during the shoulder seasons of spring and autumn.

The current state-of-the-art involves keeping the entire system, including the outdoor heat pump unit, in the current mode (heating or cooling) until all of the indoor units exit that particular mode. Only when all of the indoor units change mode will the outdoor heat pump unit change its mode of operation. In other words, if the outdoor heat pump unit is in a heating mode, it will not change to a cooling mode until all of the indoor units change to a cooling mode (i.e., until all of the indoor units request cooling from the outdoor heat pump unit).

This can cause a problem for homeowners in that an individual zone can force the entire system to remain in a particular operational mode (heating or cooling) even when all of the other zones in the house require the other mode. For example, if the outdoor heat pump unit is in a cooling mode, every indoor unit but one is in a heating mode (requesting heating from the outdoor heat pump unit) and a single indoor unit is in a cooling mode (requesting cooling from the outdoor heat pump unit) the outdoor heat pump unit will remain in a cooling mode for as long as that last indoor unit is in the cooling mode.

It would therefore be desirable to provide a way to improve the decision-making process to allow for an air conditioning system to switch between heating and cooling modes for an outdoor heat pump unit in a way that more closely matches the desires of a homeowner or building manager.

SUMMARY OF THE INVENTION

A computer-implemented method of controlling an operational mode of an outdoor air-conditioning unit connected to a plurality of indoor air-conditioning units is provided, the method comprising: determining the operational mode of the outdoor air-conditioning unit; determining a priority for each of the plurality of indoor air-conditioning units, a maximum standby duration for the plurality of indoor air-conditioning units, and a minimum active duration for the outdoor air-conditioning unit; providing a master decision unit with the priority for each of the plurality of indoor air-conditioning units, the maximum standby duration for the plurality of indoor air-conditioning units, and the minimum active duration for the outdoor air-conditioning unit; determining a current area mode, a current area temperature, a set point, and an actual standby duration for each of the plurality of indoor air-conditioning units, and a current active duration for the outdoor air-conditioning unit; providing the master decision unit with the current area mode, the current area temperature, the set point, and the actual standby duration for each of the plurality of indoor air-conditioning units, and the current active duration for the outdoor air-conditioning unit; determining a maximum actual standby duration to be equal to a maximum value of the plurality of actual standby durations; determining, at the master decision unit, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and systematically controlling the operational mode to become the target outdoor mode when the target outdoor mode is different from the operational mode.

The master decision unit may be contained in a designated master indoor unit selected from the plurality of indoor air-conditioning units. In such an embodiment, the remainder of the plurality of indoor air-conditioning units are considered designated reporting units.

The operation of providing the current area mode, the current area temperature, the set point, and the actual standby duration for each of the plurality of indoor air-conditioning units, and the current active duration for the outdoor air-conditioning unit to the master decision unit may be repeated at least every set time period.

The set time period may be between thirty seconds and five minutes.

The operation of providing to the master decision unit the current area mode, the current area temperature, the set point, and the actual standby duration for each of the plurality of indoor air-conditioning units, and the current active duration for the outdoor air-conditioning unit may be performed whenever at least one of the current area mode, the current area temperature, and the set point for any of the plurality of indoor air-conditioning units changes.

The method may further comprise: providing the master decision unit with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the master decision unit with the unique identifier for each respective indoor air-conditioning unit when providing the master decision unit with the current area mode, the current area temperature, the set point, and the actual standby duration for that indoor air-conditioning unit, and the current active duration for the outdoor air-conditioning unit.

The current area modes for respective indoor air-conditioning units and the operational mode for the outdoor air-conditioning unit can each be either a cooling mode or a heating mode.

The method may further comprise: determining a unit request value for each of the respective indoor air-conditioning units, each respective unit request value being equal to a sum or product of a first scaling factor multiplied by the priority of the respective indoor air-conditioning unit, and a second scaling factor multiplied by a temperature differential for the respective indoor air-conditioning unit; determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and the active mode is equal to the operational mode, and the inactive mode is equal to a mode other than the operational mode.

When the current active duration for the outdoor air-conditioning unit is less than the minimum active duration, the target outdoor mode may be set to be the active mode; when the current active duration for the outdoor air-conditioning unit greater than or equal to the minimum active duration and the maximum actual standby duration is greater than the maximum allowed standby duration, the target mode may be set to be the inactive mode; when the current active duration for the outdoor air-conditioning unit greater than or equal to the minimum active duration, the maximum actual standby duration is less than or equal to the maximum allowed standby duration, and the inactive request value is greater than the active request value, the target mode may be set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode may be set to be the active mode.

A non-transitory computer-readable medium comprising instructions for execution by a computer is provided, the instructions including a computer-implemented method for a master decision unit to control an operational mode of an outdoor air-conditioning unit connected to a plurality of indoor air-conditioning units, the instructions for implementing: determining the operational mode of the outdoor air-conditioning unit; determining a priority for each of the plurality of indoor air-conditioning units, a maximum standby duration for the plurality of indoor air-conditioning units, and a minimum active duration for the outdoor air-conditioning unit; providing the master decision unit with the priority for each of the plurality of indoor air-conditioning units, the maximum standby duration for the plurality of indoor air-conditioning units, and the minimum active duration for the outdoor air-conditioning unit; determining a current area mode, a current area temperature, a set point, and an actual standby duration for each of the plurality of indoor air-conditioning units, and a current active duration for the outdoor air-conditioning unit; providing the master decision unit with the current area mode, the current area temperature, the set point, and the actual standby duration for each of the plurality of indoor air-conditioning units, and the current active duration for the outdoor air-conditioning unit; determining a maximum actual standby duration to be equal to a maximum value of the plurality of actual standby durations; determining, at the master decision unit, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and systematically controlling the operational mode to become the target outdoor mode when the target outdoor mode is different from the operational mode.

The master decision unit may be contained in a designated master indoor unit selected from the plurality of indoor air-conditioning units. In such an embodiment, the remainder of the plurality of indoor air-conditioning units are considered designated reporting units.

The operation of providing the current area mode, the current area temperature, the set point, and the actual standby duration for each of the plurality of indoor air-conditioning units, and the current active duration for the outdoor air-conditioning unit to the master decision unit may be repeated at least every set time period.

The set time period may be between thirty seconds and five minutes.

The operation of providing to the master decision unit the current area mode, the current area temperature, the set point, and the actual standby duration for each of the plurality of indoor air-conditioning units, and the current active duration for the outdoor air-conditioning unit may be performed whenever at least one of the current area mode, the current area temperature, and the set point for any of the plurality of indoor air-conditioning units changes.

The instructions including a computer-implemented method may further comprise: providing the master decision unit with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the master decision unit with the unique identifier for each respective indoor air-conditioning unit when providing the master decision unit with the current area mode, the current area temperature, the set point, and the actual standby duration for that indoor air-conditioning unit, and the current active duration for the outdoor air-conditioning unit.

The current area modes for respective indoor air-conditioning units and the operational mode for the outdoor air-conditioning unit can each be either a cooling mode or a heating mode.

The instructions including a computer-implemented method may further comprise: determining a unit request value for each of the respective indoor air-conditioning units, each respective unit request value being equal to a sum or a product of a first scaling factor multiplied by the priority of the respective indoor air-conditioning unit, and a second scaling factor multiplied by a temperature differential for the respective indoor air-conditioning unit; determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and an active mode is equal to the operational mode, and an inactive mode is equal to a mode other than the operational mode.

The non-transitory computer-readable medium, as recited in claim 15, wherein when the current active duration for the outdoor air-conditioning unit is less than the minimum active duration, the target outdoor mode may be set to be the active mode; when the current active duration for the outdoor air-conditioning unit is greater than or equal to the minimum active duration and the maximum actual standby duration is greater than the maximum allowed standby duration, the target mode may be set to be the inactive mode; when the current active duration for the outdoor air-conditioning unit is greater than or equal to the minimum active duration, the maximum actual standby duration is less than or equal to the maximum allowed standby duration, and the inactive request value is greater than the active request value, the target mode may be set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode may be set to be the active mode.

A computer system configured for controlling an operational mode of an outdoor air-conditioning unit connected to a plurality of indoor air-conditioning units is provided, the system comprising: a transceiver operable to transmit and receive communications over at least a portion of a network; a memory configured to store data and instructions; and a processor cooperatively operable with the transceiver and the memory, and configured to facilitate: determining the operational mode of the outdoor air-conditioning unit; determining a priority for each of the plurality of indoor air-conditioning units, a maximum standby duration for the plurality of indoor air-conditioning units, and a minimum active duration for the outdoor air-conditioning unit; providing the processor with the priority for each of the plurality of indoor air-conditioning units, the maximum standby duration for the plurality of indoor air-conditioning units, and the minimum active duration for the outdoor air-conditioning unit; determining a current area mode, a current area temperature, a set point, and an actual standby duration for each of the plurality of indoor air-conditioning units, and a current active duration for the outdoor air-conditioning unit; providing the processor with the current area mode, the current area temperature, the set point, and the actual standby duration for each of the plurality of indoor air-conditioning units, and the current active duration for the outdoor air-conditioning unit; determining a maximum actual standby duration to be equal to a maximum value of the plurality of actual standby durations; determining, at the processor, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and systematically controlling the operational mode to become the target outdoor mode when the target outdoor mode is different from the operational mode.

The master decision unit may be contained in a designated master indoor unit selected from the plurality of indoor air-conditioning units. In such an embodiment, the remainder of the plurality of indoor air-conditioning units are considered designated reporting units.

The operation of providing the current area mode, the current area temperature, the set point, and the actual standby duration for each of the plurality of indoor air-conditioning units, and the current active duration for the outdoor air-conditioning unit to the processor may be repeated at least every set time period.

The set time period may be between thirty seconds and five minutes.

The operation of providing to the processor the current area mode, the current area temperature, the set point, and the actual standby duration for each of the plurality of indoor air-conditioning units, and the current active duration for the outdoor air-conditioning unit may be performed whenever at least one of the current area mode, the current area temperature, and the set point for any of the plurality of indoor air-conditioning units changes.

The processor cooperatively operable with the transceiver and the memory may be further configured to facilitate: providing the processor with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the processor with the unique identifier for each respective indoor air-conditioning unit when providing the processor with the current area mode, the current area temperature, the set point, and the actual standby duration for that indoor air-conditioning unit, and the current active duration for the outdoor air-conditioning unit.

The current area modes for respective indoor air-conditioning units and the operational mode for the outdoor air-conditioning unit can each be either a cooling mode or a heating mode.

The processor cooperatively operable with the transceiver and the memory may be further configured to facilitate: determining a unit request value for each of the respective indoor air-conditioning units, each respective unit request value being equal to a sum or a product of a first scaling factor multiplied by the priority of the respective indoor air-conditioning unit, and a second scaling factor multiplied by a temperature differential for the respective indoor air-conditioning unit; determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and an active mode is equal to the operational mode, and an inactive mode is equal to a mode other than the operational mode.

When the current active duration for the outdoor air-conditioning unit is less than the minimum active duration, the target outdoor mode may be set to be the active mode; when the current active duration for the outdoor air-conditioning unit is greater than or equal to the minimum active duration and the maximum actual standby duration is greater than the maximum allowed standby duration, the target mode may be set to be the inactive mode; when the current active duration for the outdoor air-conditioning unit is greater than or equal to the minimum active duration, the maximum actual standby duration is less than or equal to the maximum allowed standby duration, and the inactive request value is greater than the active request value, the target mode may be set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode may be set to be the active mode.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Multiple-Zone Heat Pump Refrigerant System

Figure 1:
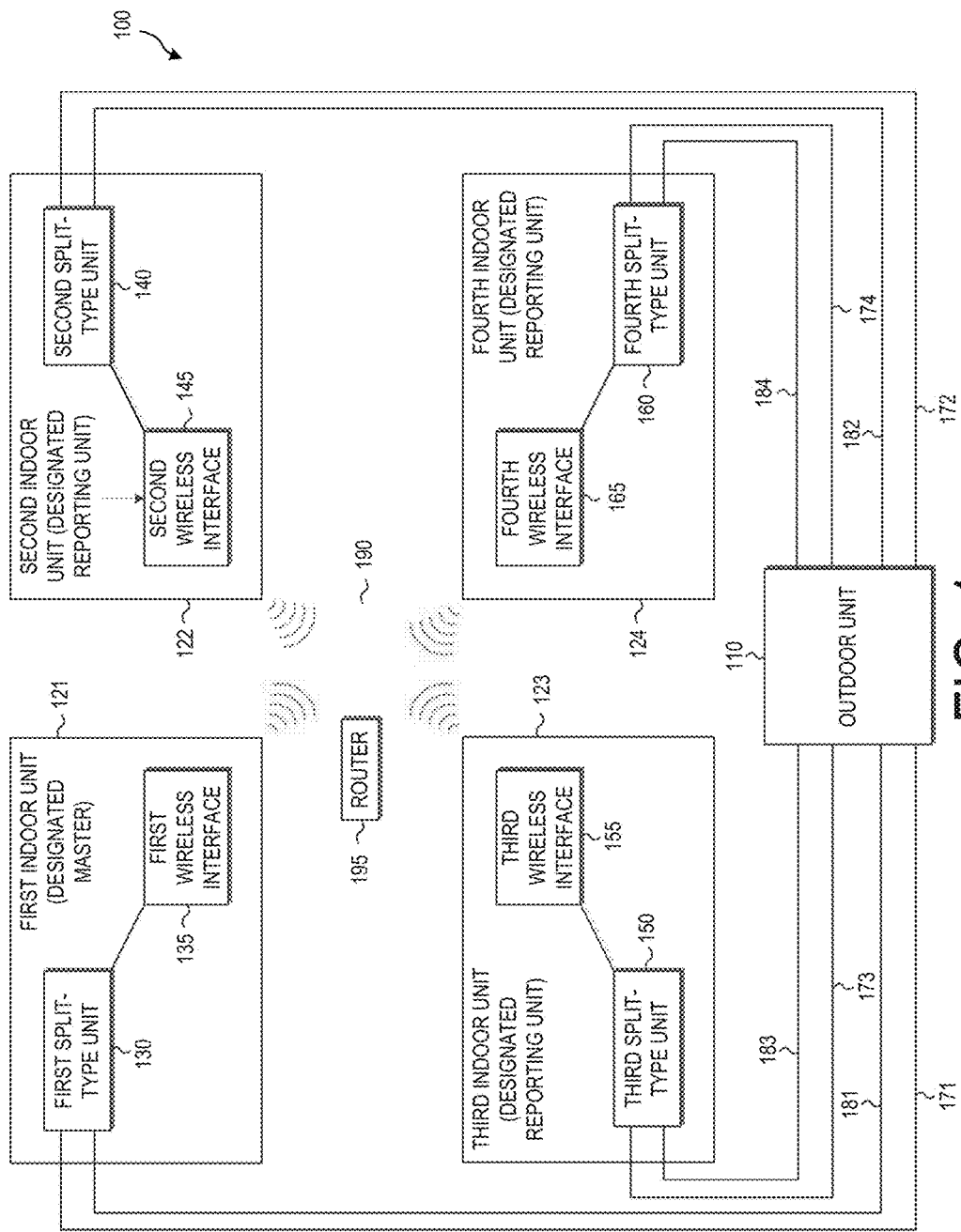
FIG. 1 is a block diagram of a multiple-zone heat pump refrigerant system according to disclosed embodiments.

FIG. 1 is a block diagram of a multiple-zone heat pump refrigerant system 100 (which can be referred to generally as an air-conditioning system) according to disclosed embodiments. As shown in FIG. 1, the multiple-zone heat pump refrigerant system 100 includes an outdoor unit 110, and first, second, third, and fourth indoor units 121, 122, 123, 124. The first indoor unit 121 includes a first split-type unit 130 and a first wireless interface 135; the second indoor unit 122 includes a second split-type unit 140 and a second wireless interface 145; the third indoor unit 123 includes a third split-type unit 150 and a third wireless interface 155; and the fourth indoor unit 124 includes a fourth split-type unit 160 and a fourth wireless interface 165. Typically, the outdoor unit 110 will be located outside of a building, while the first, second, third, and fourth indoor units 121, 122, 123, 124 will be located inside the building such that they can each heat or cool a given zone within the building (e.g., a room or group of rooms).

The outdoor unit 110 is preferably a standard single-mode heat pump that can operate in a heating mode or a cooling mode, but not in both at the same time. An example of an outdoor unit 110 would be a Mitsubishi MXZ multi-split outdoor heat pump, a Mitsubishi PUMY series multi-split outdoor heat pump, or a Mitsubishi Y series multi-split outdoor heat pump.

The outdoor unit 110 provides coolant to the first, second, third, and fourth split-type units 130, 140, 150, 160 via first, second, third, and fourth coolant pipes 171, 172, 173, 174, respectively. The state of the coolant provided along the coolant pipes 171, 172, 173, 174 will depend upon the operational mode of the outdoor unit 110 (i.e., it will be for cooling if the outdoor unit 110 is in a cooling mode, and it will be for heating if the outdoor unit 110 is in a heating mode).

The outdoor unit 110 receives information/control signals from the first, second, third, and fourth split-type units 130, 140, 150, 160 via first, second, third, and fourth signal lines 181, 182, 183, 184, respectively. This includes control signals that will cause the outdoor unit 110 to switch operational modes.

The first, second, third, and fourth indoor units 121, 122, 123, 124 are individual air-conditioning units, each located in a different zone of a building, and are tasked with heating or cooling that zone of the building (e.g., a room or group of rooms).

The outdoor unit 110 and the indoor units 121, 122, 123, 124 are each set to be in a particular operating mode. In the disclosed embodiment, this mode is either a heating or a cooling mode. In the heating mode, the indoor units 121, 122, 123, 124 are tasked with heating their respective zones; and in the heating mode the outdoor unit 110 is tasked with providing properly prepared coolant to the indoor units 121, 122, 123, 124 so that they can perform their heating task. Similarly, in the cooling mode, the indoor units 121, 122, 123, 124 are tasked with cooling their respective zones: and in the cooling mode the outdoor unit 110 is tasked with providing properly prepared coolant to the indoor units 121, 122, 123, 124 so that they can perform their cooling task. When the outdoor unit 110 is operating in a heating mode, the entire system 100 is referred to as operating in a heating mode. Likewise, when the outdoor unit 110 is operating in a cooling mode, the entire system 100 is referred to as operating in a cooling mode.

It should be noted that when the system 100 is in the cooling mode (i.e., when the outdoor unit 110 is in the cooling mode), those indoor units in the heating mode are unable to perform their heating function, but are in a standby condition (standby status) waiting for the system 100 to enter a heating mode. Likewise, when the system 100 is in the heating mode (i.e., when the outdoor unit 110 is in the heating mode), those indoor units in the cooling mode are unable to perform their cooling function, but are in a standby condition waiting for the system 100 to enter a cooling mode. A standby condition is a condition in which an indoor unit is unable to operate in a desired mode due to the outdoor unit operating in a different mode.

The mode of outdoor unit 110 is referred to as the active mode ($Mode_{Active}$), while the other possible mode is referred to as the inactive mode ($Mode_{Inactive}$). Thus, the outdoor unit 110 will always be in the active mode, while indoor units 121, 122, 23, 124 may be in either the active or the inactive mode. Equations (1) and (2) indicate how the modes are defined:

$$Mode_{Active} \in \{Heat, Cool\} \qquad (1)$$

$$Mode_{Inactive} = Mode_{Active} == Heat?Cool:Heat \qquad (2)$$

In the disclosed embodiment, the outdoor unit 110 and the indoor units 121, 122, 123, 124 each only have a single mode, though the modes of each unit need not be the same. For example, if the mode of the outdoor unit 110 is a heating mode, the modes of the indoor units could be a mix of heating and cooling modes Equation (3) identifies that Z refers to all indoor zones (i.e., indoor units 121, 122, 123, 124) connected to a particular outdoor heat pump 110; Equation (4) shows that $Z_{Active}$ refers to all of the indoor zones (i.e., indoor units 121, 122, 123, 124) that are currently in the active mode; and Equation (5) shows that $Z_{Inactive}$ refers to all of the indoor zones (i.e., indoor units 121, 122, 123, 124) that are currently in the inactive mode.

$$Z = \text{All zones connected to a particular outdoor heat pump} \qquad (3)$$

$$Z_{Active} = \{Z | Z \cdot mode == Mode_{Active}\} \qquad (4)$$

$$Z_{Inactive} = \{Z | Z \cdot mode == Mode_{Inactive}\} \qquad (5)$$

One indoor unit 121 may be designated as a master unit, while the other indoor units 122, 123, 124 may be designated as reporting units. The master unit 121 serves to control the coordination of the first through fourth indoor units 121, 122, 123, 124, while the reporting units 122, 123, 124 provide data to the master unit 121 to facilitate this control. In particular, the master unit 121 serves to coordinate the programmatic determination of the mode of the outdoor unit 110. In some embodiments, the indoor units 121, 122, 123, 124 are identical, and the choice of which should be selected as a master unit is arbitrary. In other embodiments, one indoor unit 121, 122, 123, 124 will have additional functionality that will allow it to perform the functions of a master unit. This allows the designated reporting units 122, 123, 124 to have simpler designs.

The first, second, third, and fourth split-type units 130, 140, 150, 160 are single-mode split-type air-conditioning units. Each split-type unit 130, 140, 150, 160 operates in either a heating or cooling mode, and communicates its desired mode to the outdoor unit 110. Examples of a split-type unit 130, 140, 150, 160 are the Mitsubishi Mr. Slim® M and P series split-type room air-conditioners, or the CITY MULTI® PUMY and Y-Series lines of indoor split-type room air-conditioners.

The first, second, third, and fourth first wireless interfaces 135, 145, 155, 165 communicate with each other over a wireless network 190 via a router 195, and communicate with their associated split-type unit 130, 140, 150, 160 via a wired link. As such, that they serve as an interface between their associated split-type unit 130, 140, 150, 160 and the other indoor units 121, 122, 123, 124. In various embodiments, the wireless interfaces can transmit using any suitable wireless standard, such as an IEEE 802.11 standard.

The router 195 can be a dedicated router or a multipurpose router in various embodiments. In one embodiment, the router 195 is an IEEE 802.11 router used to facilitate the wireless network 190. Alternate embodiments could also use an ad hoc network that eliminates the use of a router, if the necessary hardware were included in the wireless interfaces 135, 145, 155, 165.

In operation, the first split-type unit 130 communicates with the outdoor unit 110 via a first coolant pipe 171 and a first signal line 181; the second split-type unit 140 communicates with the outdoor unit 110 via a second coolant pipe 172 and a second signal line 182; the third split-type unit 150 communicates with the outdoor unit 110 via a third coolant pipe 173 and a third signal line 183; and the fourth split-type unit 160 communicates with the outdoor unit 110 via a fourth coolant pipe 174 and a fourth signal line 184.

Although FIG. 1 discloses that a single coolant pipe 171, 172, 173, 174 is connected directly between the outdoor unit 110 and each of the split-type units 130, 140, 150, 160, this is meant to generally represent an appropriate coolant line connection between these elements. Different specific connections can be used in different embodiments. For example, the connections can have intermediate pipes, the connection could be a daisy-chained connection, branch-type, port-type, two connection, or any suitable connection of coolant pipes that allows the outdoor unit 110 to supply coolant to the split-type units 130, 140, 150, 160.

Likewise, although a single coolant line is shown connecting the outdoor unit 110 to each split-type unit 130, 140, 150, 160, the connections are such that each split-type unit 130, 140, 150, 160 has a supply pipe and a return pipe.

Similarly, although FIG. 1 discloses that a single signal line 181, 182, 183, 184 is connected between the outdoor unit and each of the split-type units 130, 140, 150, 160, this is meant to generally represent an appropriate signal connection between the outdoor unit 110 and each of the split-type units 130, 140, 150, 160. In various embodiments this could represent direct connections, daisy-chained connections, connections via a bus, or any suitable connection mechanism.

Wireless Interface

Figure 2:
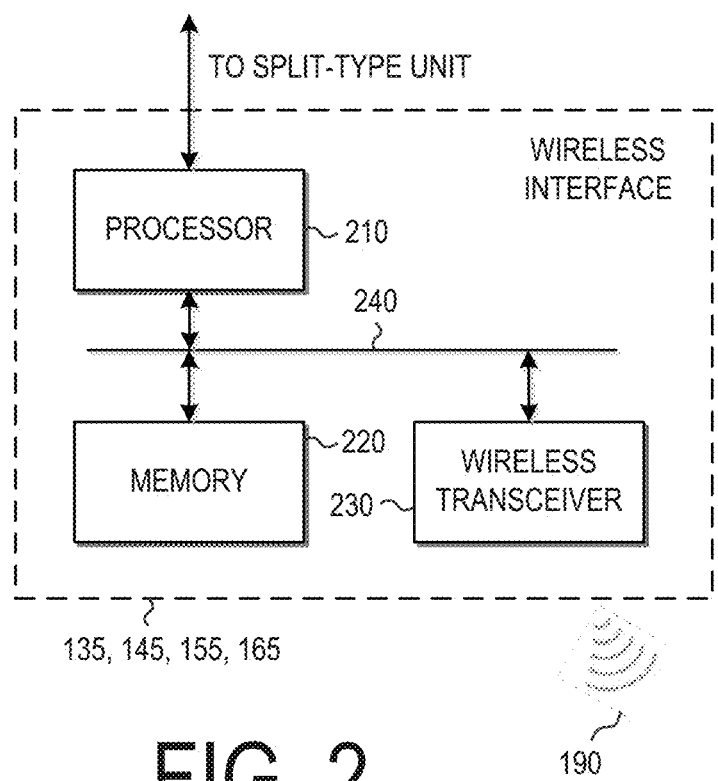
FIG. 2 is a block diagram of the wireless interface of FIG. 1 according to disclosed embodiments.

FIG. 2 is a block diagram of a wireless interface 135, 145, 155, 165 of FIG. 1 according to disclosed embodiments. Each wireless interface 135, 145, 155, 165 includes a processor 210, a memory 220, a wireless transceiver 230, and a bus 240.

The processor 210 operates to control the operation of the wireless interface 135, 145, 155, 165 and the split-type unit 130, 140, 150, 160. It can store information in the memory 220 and run instructions stored in the memory 220. The processor can be a microprocessor (e.g., a central processing unit), an application-specific integrated circuit (ASIC), or any suitable device for controlling the operation of the wireless interface 135, 145, 155, 165.

Among other duties, the processor 210 of the designated master unit 121 operates to control the determination of when to change the active mode of the outdoor unit 110 based on information it gathers and information received from the designated reporting units 122, 123, 124.

The memory 220 can include a read-only memory (ROM), a random access memory (RAM), an electronically programmable read-only memory (EPROM), an electrically erasable programmable read only memory (EEPROM), flash memory, or any suitable memory device.

The wireless transceiver 230 is configured to connect wirelessly with other wireless transceivers 230 in other indoor units 121, 122, 123, 124 over the wireless network 190. It can be any suitable wireless transceiver, such as an IEEE 802.11 wireless transceiver or the like.

In some embodiments, the wireless transceiver 230 can be capable of transmitting and receiving using the multiple wireless standards. For example, the wireless transceiver 230 could include the capability to transmit and receive using an IEEE 802.11 standard for normal operation, and also include the capability to transmit and receive using Bluetooth for device set up.

The bus 240 operates to provide a wired connection between the processor 210, the memory 220, and the wireless transceiver 230. It can be any kind of standard bus used to connect the processor 210, the memory 220, and the wireless transceiver 230.

Although not shown, in alternate embodiments the wireless transceiver 230 can also include a security device to maintain a secure connection between the wireless transceiver 230 and wireless transceivers 230 in different wireless interfaces 135, 145, 155, 165, between the wireless interfaces 135, 145, 155, 165 and the router 195 or server, and between the wireless interfaces 135, 145, 155, 165 and a remote mobile device (e.g., during device setup).

Master Zone Configuration Operation

Figure 3:
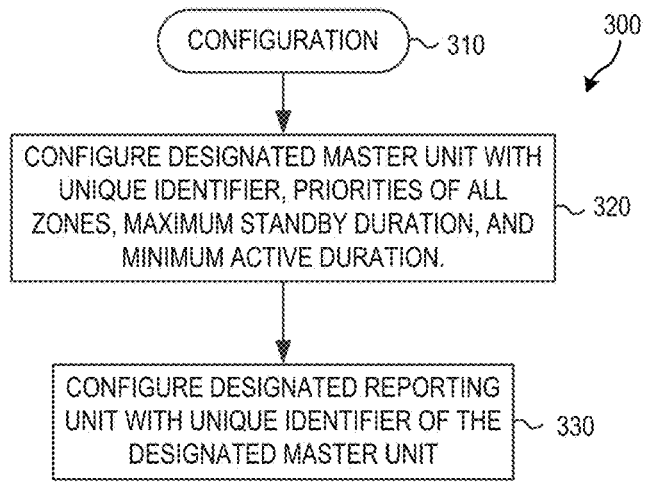
FIG. 3 is a flowchart of a master zone configuration operation according to disclosed embodiments.

FIG. 3 is a flowchart of a master zone configuration operation 300 according to a disclosed embodiment. It shows a process for configuring the master indoor unit 121 from a master zone within a building.

As shown in FIG. 3, after the master zone configuration operation begins (310), the system configures the designated master unit 121 (i.e., the master zone) with unique identifiers for each designated reporting unit 122, 123, 124 (e.g., serial numbers, MAC addresses, etc.), user-defined priorities associated with all of the designated reporting units 122, 123, 124, maximum standby durations associated with all of the designated reporting units 122, 123, 124, and a maximum active durations for the outdoor unit 110. (320) The designated master unit 121 will have first and second scaling factors built into it so that it will not need to receive these during a configuration operation.

A standby condition is a condition in which an indoor unit is unable to operate in a desired mode due to the outdoor unit operating in a different mode. In particular, when the system 100 is in a given active mode, all indoor units in the inactive mode will be in a standby condition, unable to perform their desired heating or cooling action until the system switches to the inactive mode. For example, if the system 100 is in the heating mode (i.e., the outdoor unit 110 is in heating mode) and an indoor unit 121, 122, 123, 124 is in the cooling mode, then the indoor unit 121, 122, 123, 124 in the cooling mode will be in a standby condition, unable to perform a cooling operation on its designated zone. Only when the system 100 switches to the cooling mode will the indoor unit 121, 122, 123, 124 exit the standby condition and be able to perform a cooling operation.

A current standby duration for a given indoor unit 121, 122, 123, 124 is the amount of time the indoor unit 121, 122, 123, 124 has been in a standby condition.

A maximum actual standby duration is a maximum allowable duration for the current standby duration for any of the indoor units 121, 122, 123, 124.

The user-defined priorities may vary from indoor unit 121, 122, 123, 124 to indoor unit 121, 122, 123, 124; the maximum standby durations may vary from indoor unit 121, 122, 123, 124 to indoor unit 121, 122, 123, 124 or it may be the same for all indoor units 121, 122, 123, 124.

Once the designated master unit 121 is properly configured, the system then configures the designated reporting units 122, 123, 124 (i.e., the reporting zones) with a unique identifier of the designated master unit 121 (e.g., the serial number, MAC address, etc.). (330) This is to facilitate communications between the designated master unit 121 and each of the designated reporting units 122, 123, 124.

At the end of this configuration operation 300, the designated master unit 121, and the designated reporting units 122, 123, 124 will be prepared for general operation of the air-conditioning system 100.

Zone Reporting Operation

Figure 4:
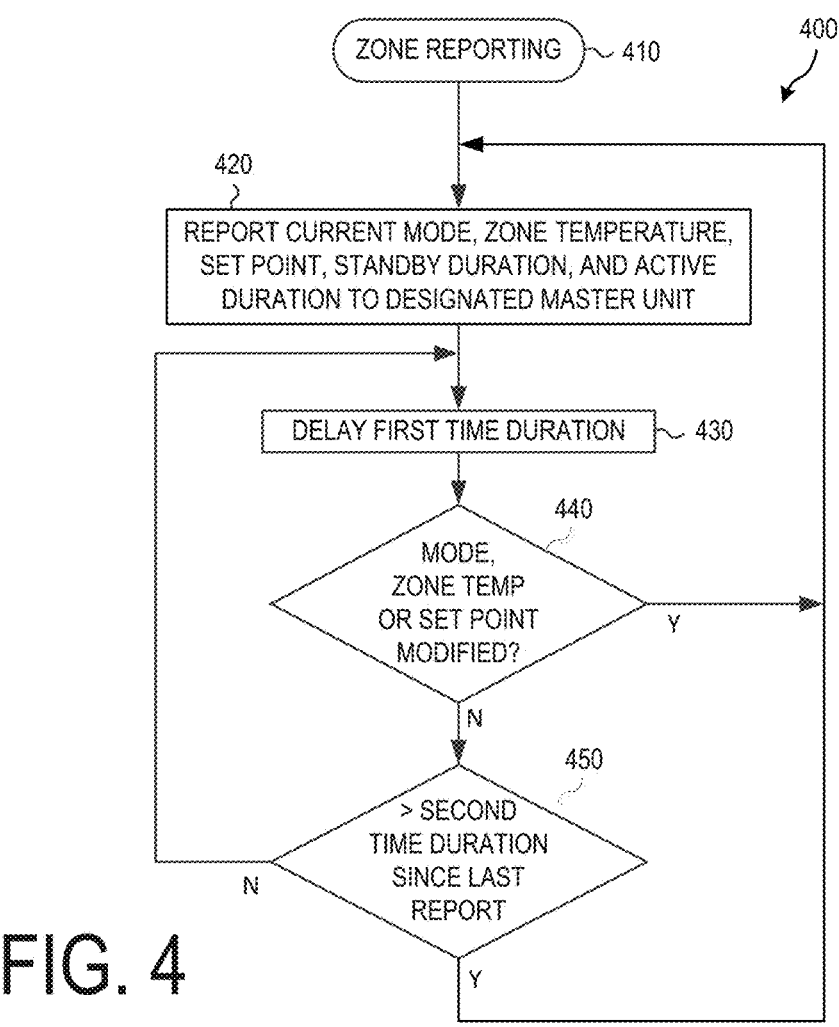
FIG. 4 is a flowchart of a zone reporting operation according to disclosed embodiments.

FIG. 4 is a flowchart of a zone reporting operation 400 according to a disclosed embodiment. It shows a process by which each designated reporting unit 122, 123, 124 (i.e. each reporting zone) provides a zone report to the designated master unit 121, and a process by which the designated master unit 121 gathers information about its own operation.

As shown in FIG. 4, after the zone reporting operation begin (410), an indoor unit 121, 122, 123, 124 will report its current mode, its current zone temperature, its current temperature set point, its current standby duration, and a current active duration of outdoor unit 110 to the designated master unit 121. (420) In the case of the designated master unit 121 reporting, there need be no formal report sent. The designated master unit 121 need simply check its gathered information. In the case of the designated reporting units 122, 123, 124, the relevant information will be sent via a wireless transmission from the designated reporting unit 122, 123, 124 to the designated master unit 121 over the wireless network 190.

The current mode of the indoor unit 121, 122, 123, 124 will be either a heating mode or a cooling mode, as indicated by Equations (1) and (2).

The current zone temperature is a current temperature of the zone to which the indoor unit 121, 122, 123, 124 is assigned. For example, if the indoor unit 121, 122, 123, 124 is assigned to a specific room, the zone temperature will be the current temperature of that room.

The current temperature set point is the target temperature designated by the user of the system for the zone associated with the indoor unit 121, 122, 123, 124. For example, if each indoor unit 121, 122, 123, 124 is assigned to a specific room, the current temperature set point is the desired temperature for that room set by the user of the system.

The current standby duration is a current time during which the indoor unit 121, 122, 123, 124 has been waiting for a change in mode (i.e., the amount of time it has been in the inactive mode). For example, if the indoor unit 121, 122, 123, 124 is in a cooling mode while the outdoor unit 110 is in a heating mode, the time during which indoor unit 121, 122, 123, 124 has been in the cooling mode and has been requesting that the outdoor unit 110 enter into the cooling mode would be the current standby duration for that indoor unit 121, 122, 123, 124. If an indoor unit 121, 122, 123, 124 is in the active mode (i.e., it does not seek to change the outdoor unit 110 to a different mode), then the current standby duration for that indoor unit 121, 122, 123, 124 is zero.

The current active duration is a length of time that the outdoor unit 110 has been in its current active mode (i.e., the elapsed time since the outdoor unit 110 last changed to the active mode). For example, if the outdoor unit 110 is in a heating mode, the current active duration is the length of time during which the outdoor unit 110 has been in the heating mode (i.e., the elapsed time since it last changed from the cooling mode to the heating mode).

$$\text{Duration}_{Active} = \text{elapsed time since last change to Mode}_{Active} \quad (6)$$

Once the indoor unit 121, 122, 123, 124 has provided its report (420), it will wait for a first time duration before proceeding further. (430) This delay is included to prevent the indoor unit 121, 122, 123, 124 from continually providing reports when certain parameters are continually changing.

After waiting for the first time duration, the indoor unit 121, 122, 123, 124 will determine whether its current mode, current zone temperature, or current set point have been modified. (440) If any of the current mode, current zone temperature, or current set point have been modified, the indoor unit 121, 122, 123, 124 will immediately report its current mode, current zone temperature, current set point, standby duration, and the current active duration to the designated master unit 121. (420) Again, this could be self-reporting by the designated master unit 121 or reporting over the wireless network 190 for the designated reporting units 122, 123, 124.

If, however, none of the current mode, current zone temperature, or current set point have been modified, the indoor unit 121, 122, 123, 124 will determine whether a second time duration has elapsed since the last report. (450) If the second time duration has not elapsed, the system again delays by the first time duration (430) and again determines whether the current mode, current zone temperature, or current set point have been modified. (430)

If the second time duration has elapsed, however the indoor unit 121, 122, 123, 124 again reports its current mode, current zone temperature, current set point, current standby duration, and current active duration to the designated master unit 121. (420) This guarantees that the designated reporting unit 122, 123, 124 will report to the designated master unit 121 at least as frequently as the second time duration, and that the designated master unit 121 will check its own data at least as frequently as the second time duration, even if no significant information has changed.

This operation continues for as long as the system is operational so that the designated master unit 121 has sufficient information to control the operation of the air-conditioning system 100.

The first time duration used during the delaying operation (430) is preferably in the range of one to two minutes, though any duration less than the second time duration is acceptable. The second time duration is preferably in the range of three to five minutes, but can be shorter or longer if desired.

Changeover Monitoring Operation

Figure 5:
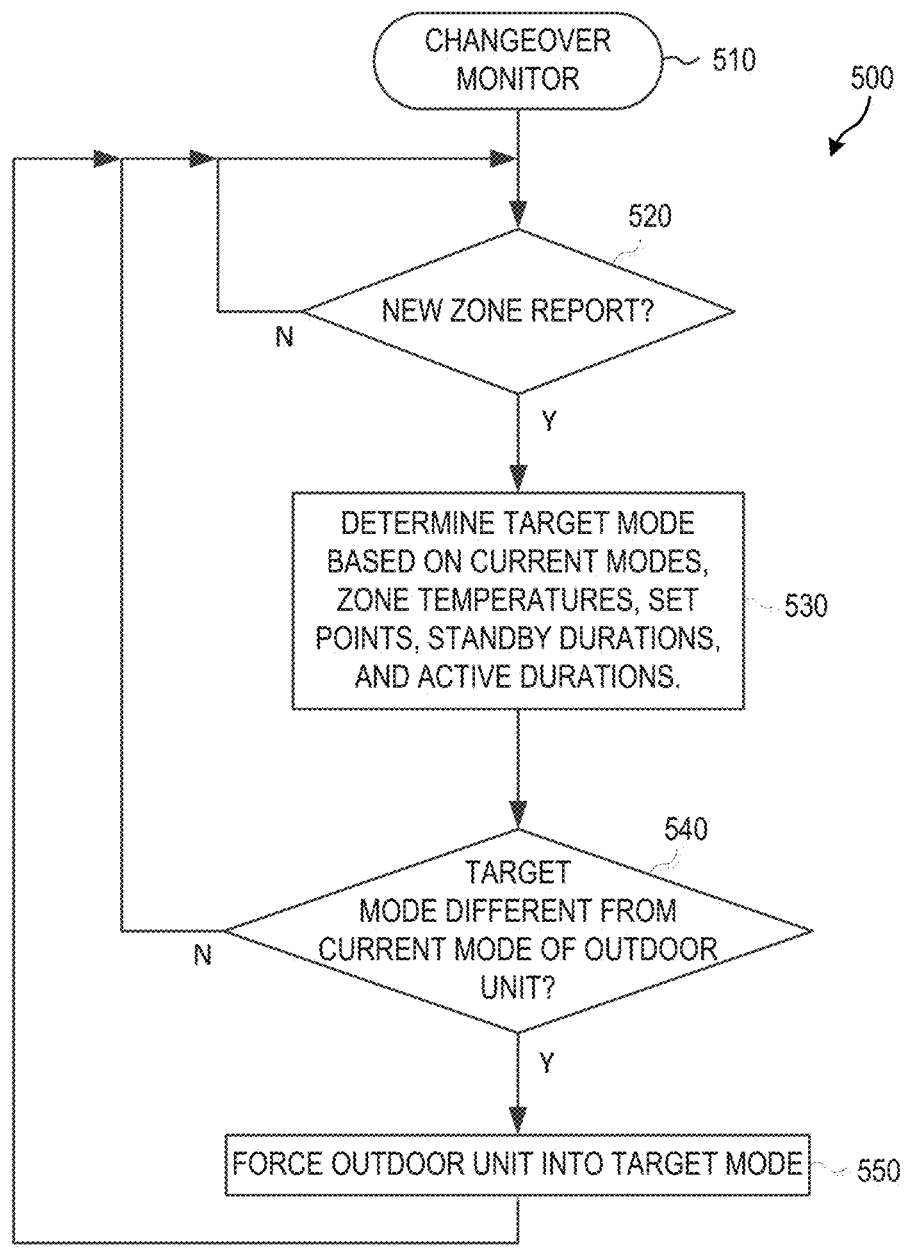
FIG. 5 is a flowchart of a changeover monitoring operation according to disclosed embodiments.

FIG. 5 is a flowchart of a changeover monitoring operation 500 according to a disclosed embodiment. This operation shows how a designated master unit 121 operates to determine whether or not the outdoor unit 110 should be forced to change modes.

After the changeover monitoring operation 500 begins (510), the designated master unit 121 determines whether it has received a new zone report from any of the designated reporting units 122, 123, 124 or has generated its own zone report. (520) If it has not received a new zone report, it returns to waiting for a new zone report. (520) As noted above with respect to FIG. 4, a new zone report will come from each indoor unit 121, 122, 123, 124 at least every second time duration.

If the master unit 121 does receive a new zone report (520), it then proceeds to determine the a target mode based on the current modes, current zone temperatures, current set points, current standby durations, and current active durations of the indoor units 121, 122, 123, 124. (530) More detail on this operation will be provided in the discussion of FIG. 6. In making this determination, the designated master unit 121 has information regarding its own parameters, and has received parameters from the designated reporting units 122, 123, 124 via zone reporting operations 300.

Once the designated master unit has determined a target mode, it simply determines whether this target mode is different from a current mode of the outdoor unit 110. (540) if the target mode is not different from the current mode of the outdoor unit 110 (i.e., the outdoor unit does not need to change its mode), then the designated master unit will then return to await a new zone report (520) without taking any further action. In this case, the target mode of the outdoor unit remains in its current active mode.

If, however the target mode determined in the target mode determination operation (530) is different from the current mode of the outdoor unit 110, the designated master unit programmatically changes the current mode of the outdoor unit 110 to the target mode (i.e., it causes the outdoor unit 110 to switch its current mode).

For example, if the current mode of the outdoor unit 110 was the heating mode, and the target mode determination operation (530) determined a target mode to be the cooling mode, then the designated master unit 121 would cause the outdoor unit 110 to change from the heating mode to the cooling mode. Similarly, if the current mode of the outdoor unit 110 was the heating mode and the target mode determination operation (530) determined a target mode to also be the heating mode, then the designated master unit 121 would not alter the current mode of the outdoor unit 110 at all, but would instead return to waiting for a new zone report (520).

Target Mode Determination Operation

Figure 6:
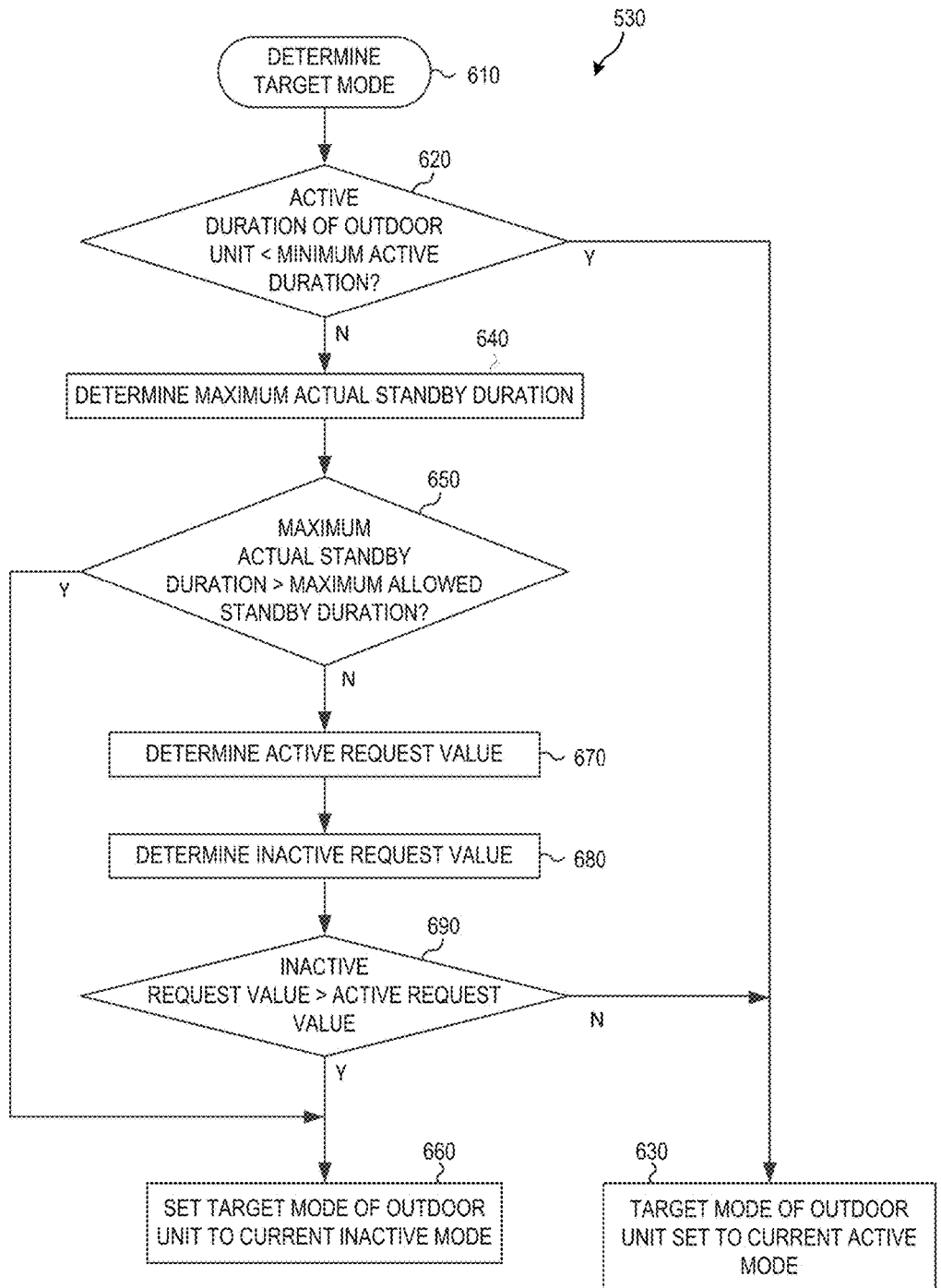
FIG. 6 is a flowchart of a target mode determination operation according to disclosed embodiments.

FIG. 6 is a flowchart of a target mode determination operation 530 according to a disclosed embodiment. In this operation the designated master unit 121 determines a target mode for the outdoor unit 110 based on a received zone report from one of the indoor units 121, 122, 123, 124, and the various parameters of the indoor units 121, 122, 123, 124.

As shown in FIG. 5, the designated master unit 121 makes this determination each time it receives a new zone report from either itself 121, or from one of the designated reporting units 122, 123, 124.

After the target determining mode begins (610), the designated master unit 121 determines whether the current active duration of the outdoor unit 110 is less than a set minimum active duration. (620)

If the current active duration of the outdoor unit 110 is less than the minimum active duration than the target mode of the outdoor unit 110 is set to the current active mode. In other words, the active mode of the outdoor unit 110 is not set to change. This determination is made so that the mode of the outdoor unit 110 does not continually change when parameters are varying. The outdoor unit 110 must stay in its current mode for at least a minimum active duration before it can be switched. In various embodiments, the minimum active duration can be in the range of five to twenty minutes, though any suitable minimum active duration can be used in other embodiments.

If, however, the current active duration of the outdoor unit 110 is greater than or equal to the minimum active duration (i.e., the outdoor unit 110 has been in its current mode for at least the minimum active duration), then the designated master unit 121 will proceed to determine the maximum actual standby duration of all of the indoor units 121, 122, 123, 124. (640) The maximum actual standby duration is an indication of a maximum value of the current standby durations of all of the indoor units 121, 122, 123, 124. In other words, it represents the longest that one of the indoor units 121, 122, 123, 124 has been waiting a change in the operational mode of the outdoor unit 110.

$$\text{Duration}_{Standby} = \max_{n \in Z_{Inactive}} Z \cdot \text{standbyDuration} \quad (7)$$

Once it determines the maximum actual standby duration of all of the outdoor units 121, 122, 123, 124 (640), the designated master unit 121 will determine whether the maximum actual standby duration is greater than a maximum allowed standby duration. (650) The maximum allowed standby duration is the maximum time a given indoor unit 121, 122, 123, 124 will be forced to wait for a desired change in the operational mode of the outdoor unit 110 before its request will be granted. For example, if the maximum allowed standby duration was three hours, then the outdoor unit 110 will switch modes if any indoor unit 121, 122, 123, 124 has been waiting longer than three hours for the outdoor unit 110 to switch modes. In various embodiments, the maximum allowed standby duration can be in the range of one to twenty-four hours, though any other suitable duration could be used, For example, the upper limit of the maximum allowed standby duration could be much higher than twenty-four hours. although in alternate embodiments any suitable maximum allowed standby duration can be used.

If the maximum actual standby duration is greater than the maximum allowed standby duration (i.e., if one of the indoor units 121, 122, 123, 124 has been waiting longer than the maximum allowed standby duration for a change in the mode of the outdoor unit 110), then the designated master unit 121 will set the target mode of the outdoor unit to the current inactive mode (i.e., it will indicate that the outdoor unit 110 should switch modes). (660)

If, however, the maximum actual standby duration is less than or equal to the maximum allowed standby duration, then the designated master unit 121 will proceed to determine an active request value (670) and determine an inactive request value (680). The active request value indicates how much the system in general desires the outdoor unit 110 to remain in its active mode (i.e., its current mode). Similarly, the inactive request value indicates how much the system in general desires the outdoor unit 110 to switch to its inactive mode (i.e., the opposite mode to its current mode). In other words, if the outdoor unit 110 is in a heating mode, the active request value indicates how much the system in general desires the outdoor unit 110 to remain in the heating mode, while the inactive request value indicates how much the system in general desires the outdoor unit 110 to switch to the cooling mode.

The active request value is determined based on a first scaling factor $a_0$, a second scaling factor $a_1$, a user-defined priority given to each indoor unit 121, 122, 123, 124 in the active mode (i.e., requesting the same mode as the outdoor unit 110 is currently in), a current temperature set point for each indoor unit 121, 122, 123, 124 in the active mode, and a current zone temperature for each indoor unit 121, 122, 123, 124 in the active mode. In particular, according to the current embodiment, $$R_A = \sum_{n \in Z_{active}} a_0 * P_n + a_1 * |SP_n - ZT_n|, \quad (8)$$

where $R_A$ is the active request value, n is an index value, $Z_{active}$ is the group of indoor units 121, 122, 123, 124 in the active mode (i.e., requesting the same mode as the outdoor unit 110 is currently in), $a_0$ is the first scaling factor, $a_1$ is the second scaling factor, $P_n$ is the priority given to the $n^{th}$ indoor unit 121, 122, 123, 124 in the active mode, $SP_n$ is the current set point of the $n^{th}$ indoor unit in the active mode, and $ZT_n$ is the current zone temperature of the $n^{th}$ indoor unit in the active mode.

It should be noted that although this embodiment discloses that $R_A$ is equal to the sum of the first scaling factor $a_0$ multiplied by the priority given to the $n^{th}$ indoor unit 121, 122, 123, 124 and the second scaling factor a1 multiplied by the temperature differential ($|SP_n-ZT_n|$) for all of the active units, alternate embodiments could vary this value. In particular, in one alternate embodiment, $R_A$ could be equal to the product of the first scaling factor $a_0$ multiplied by the priority given to the $n^{th}$ indoor unit 121, 122, 123, 124 and the second scaling factor $a_1$ multiplied by the temperature differential ($|SP_n-ZT_n|$) for all of the active units.

$$R_A = \sum_{n \in Z_{active}} (a_0 * P_n)(a_1 * |SP_n - ZT_n|), \quad (9)$$

Similarly, the inactive request value is determined based on the first scaling factor $a_0$, the second scaling factor $a_1$, a user-defined priority given to each indoor unit 121, 122, 123, 124 in the inactive mode (i.e., requesting a different mode than the outdoor unit 110 is currently in), a current temperature set point for each indoor unit 121, 122, 123, 124 in the inactive mode, and a current zone temperature for each indoor unit 121, 122, 123, 124 in the inactive mode. In particular, according to the current embodiment, $$R_I = \sum_{n \in Z_{active}} a_0 * P_n + a_1 * |SP_n - ZT_n|, \quad (10)$$

where $R_I$ is the active request value, n is an index value, $Z_{inactive}$ is the group of indoor unit 121, 122, 123, 124 in the inactive mode (i.e., requesting a different mode than the outdoor unit 110 is currently in), $a_0$ is the first scaling factor, $a_1$ is the second scaling factor, $P_n$ is the priority given to the $n^{th}$ indoor unit 121, 122, 123, 124 in the inactive mode, $SP_n$ is the current set point of the $n^{th}$ indoor unit in the inactive mode, and $ZT_n$ is the current zone temperature of the $n^{th}$ indoor unit in the inactive mode.

It should be noted that although this embodiment discloses that $R_I$ is equal to the sum of the first scaling factor $a_0$ multiplied by the priority given to the $n^{th}$ indoor unit 121, 122, 123, 124 and the second scaling factor a1 multiplied by the temperature differential ($|SP_n-ZT_n|$) for all of the inactive units, alternate embodiments could vary this value. In particular, in one alternate embodiment, $R_I$ could be equal to the product of the first scaling factor $a_0$ multiplied by the priority given to the $n^{th}$ indoor unit 121, 122, 123, 124 and the second scaling factor $a_1$ multiplied by the temperature differential ($|SP_n-ZT_n|$) for all of the inactive units.

$$R_I = \sum_{n \in Z_{active}} (a_0 * P_n)(a_1 * |SP_n - ZT_n|), \quad (11)$$

As shown in equations (8) through (11), the active request value and the inactive request value are each determined based on more than just how many active or inactive devices there are. They are also dependent upon the values of the first and second scaling factors $a_0$ and $a_1$, the user-defined priorities given to each indoor unit 121, 122, 123, 124 (i.e., each indoor zone), and the difference between a current temperature for an indoor unit 121, 122, 123, 124 and its set temperature (i.e., the temperature set for that indoor unit 121, 122, 123, 124 by the system user).

The first and second scaling factors $a_0$ and $a_1$ are constant values determined by testing. They will remain constant throughout the operation of the air-conditioning system 100. The higher the first scaling factor $a_0$ is, the more the priority of a zone (i.e., indoor unit 121, 122, 123, 124) is taken into consideration. Likewise, the higher the second scaling factor $a_1$ is, the more the temperature differential of a zone (i.e., indoor unit 121, 122, 123, 124) is taken into consideration.

The user-defined priority indicates how much weight should be given to a particular zone (i.e., indoor unit 121, 122, 123, 124). The higher the priority the more weight is given to that zone. This way, certain zones within a building can be given a greater weight in determining whether outdoor unit 110 will switch modes. For example, a living room zone might be given a higher priority than a basement zone, meaning that when determining on active request value and an inactive request value, the designated master unit 121 will take preferences of the living room zone into greater consideration than the preferences of the basement zone.

The priority is not a binary value, however. It is possible to have gradations of priority. For example, a living room zone might have the highest priority, a bedroom zone may have a medium priority, and a basement zone may have a lowest priority. Different gradations of priority are possible by choosing different priority values.

In some embodiments, the priorities could vary with time of day. For example, a bedroom zone could have a low priority during the day, but have a high priority during the night. Similarly, a living room zone could have a high priority during the day but a low priority during the night.

In one disclosed embodiment, priorities can have a range between 1 and 10, though this is not meant to be limiting. In alternate embodiments the priorities can be any values, so long as a greater value indicates a higher priority.

The temperature differential of a given zone ($|SP_n-ZT_n|$) indicates how far away its current temperature is from its current temperature set point (i.e., the desired temperature for that zone). As shown in Equations (8) through (11), the greater the temperature differential, the greater the weight given to the desires of that particular zone (i.e., indoor unit 121, 122, 123, 124). For example, if an indoor unit 121, 122, 123, 124 was in the active mode and had a high temperature differential, this would contribute to a larger active request value; likewise if an indoor unit 121, 122, 123, 124 was in the inactive mode and had a high temperature differential, this would contribute to a larger inactive request value. This aspect of the determination serves to minimize the temperature differentials in the various zones by giving priority to the requests from zones with high temperature differentials.

After having determined the active request value (670) and the inactive request value (680), the designated master unit 121 determines whether the inactive request value is greater than the active request value. (690) If the inactive request value is greater than the active request value (i.e., the system in general prefers that the outdoor unit 110 switch its mode), then the designated master unit 121 will set the target mode of the outdoor unit 110 to the current inactive mode (i.e., it will indicate that the outdoor unit 110 should switch modes) 660). If, however the inactive request value is less than or equal to the active request value (i.e., the system in general prefers that the outdoor unit 110 stay in its current mode), then the designated master unit 121 will set the target mode of the outdoor unit 110 to the current active mode (i.e., it will indicate that the outdoor unit 110 should remain in its current mode) (630)

Thus, as shown in the target mode determination operation 530, three main criteria are considered in order of priority. Of first priority, the outdoor unit 110 must remain in its current mode for at least the minimum active duration before its mode is changed. This prevents the outdoor unit 110 from constantly changing modes when the various parameters might otherwise request such constant changes.

Of second priority, no indoor unit 121, 122, 123, 124 should have to wait longer than the maximum allowed standby duration before its request for a change in mode will be acted on. This guarantees that regardless of what the other indoor units 121, 122, 123, 124 in a building desire, each indoor unit 121, 122, 123, 124 will have its mode request acted upon at least some of the time. For example, if there are four indoor units 121, 122, 123, 124 in a building, three of which 121, 122, 123 desire a heating mode and the fourth of which 124 desires a cooling mode, after the fourth indoor unit 124 has been forced to wait for the maximum allowed standby duration, the outdoor unit 110 will switch to the cooling mode. Furthermore, because of the first priority, the outdoor unit 110 will remain in the cooling mode for at least the minimum active duration before it can move back to the heating mode. Thus, the outdoor unit 110 will service the fourth indoor unit 124 at least some of the time.

Of third priority the wishes of the individual indoor units 121, 122, 123, 124 are considered. As noted above, each indoor unit 121, 122, 123, 124 will have a priority value and a temperature differential. The larger each of these values is, more weight is given to request from that particular indoor unit 121, 122, 123, 124.

By performing the process described with respect to FIG. 6, the designated master unit 121 can determine when to switch modes in a manner that maximizes the efficiency of operation of the air-conditioning system 100. The first determination ensures that the outdoor unit 110 will not have to switch modes too frequently; the second determination ensures that each indoor unit 121, 122, 123, 124 will not be completely ignored; and the third determination ensures that higher-priority zones and zones with a higher temperature differential will be more likely to be have their needs served.

Equation (12) describes the target mode determination operation in general:

$$Mode_{Active} = (Duration_{Active} < Config_{minActive})?Mode_{Active} : (Duration_{Standby} > Config_{maxStandby})?Mode_{Inactive} : (Request_{Inactive} > Request_{Active})?Mode_{Inactive} : Mode_{Active} \quad (12)$$

Where $Duration_{Active}$ represents the duration that the outdoor unit 110 has been in the active mode, $Config_{minActive}$ represents the minimum active duration, and $Config_{maxStandby}$ represents the maximum allowed standby duration.

Alternate Embodiment

Figure 7:
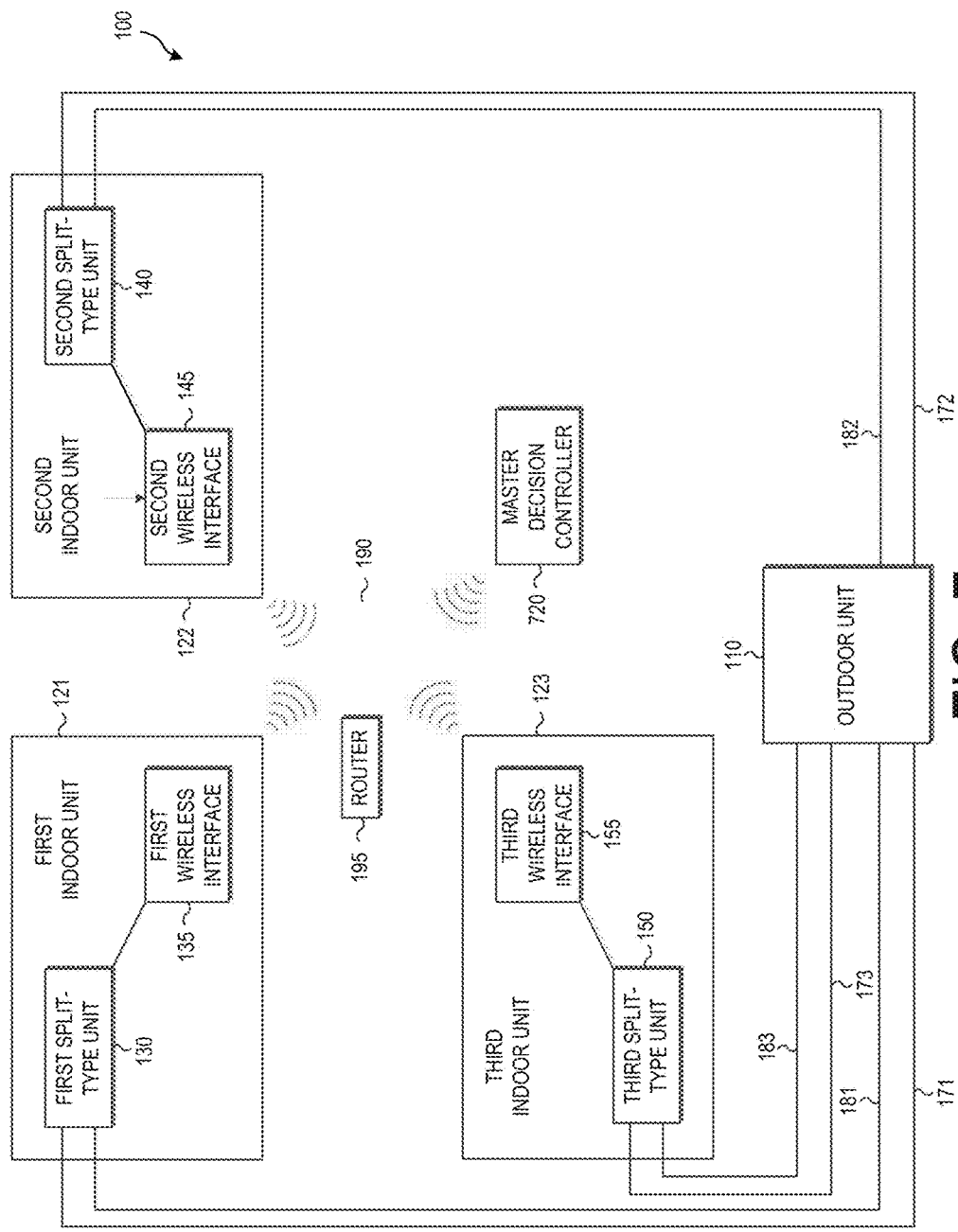
FIG. 7 is a block diagram of a multiple-zone heat pump refrigerant system according to alternate disclosed embodiments.

FIG. 7 is a block diagram of a multiple-zone heat pump refrigerant system 700 (which can be referred to generally as an air-conditioning system) according to an alternate disclosed embodiment. As shown in FIG. 7, the multiple-zone heat pump refrigerant system 100 includes an outdoor unit 110, first, second, and third indoor units 121, 122, 123, and a master decision controller 128 (i.e., a master decision unit). The first indoor unit 121 includes a first split-type unit 130 and a first wireless interface 135; the second indoor unit 122 includes a second split-type unit 140 and a second wireless interface 145; and the third indoor unit 123 includes a third split-type unit 150 and a third wireless interface 155. Typically, the outdoor unit 110 will be located outside of a building, while the first, second, and third indoor units 121, 122, 123 will be located inside the building such that they can each heat or cool a given zone within the building (e.g., a room or group of rooms).

As this embodiment shows, the controller for the indoor units 121, 122, 123 need not be another one of the indoor units 121, 122, 123, but can be a designated controller that does not perform the function of an indoor unit (i.e., a master decision controller 128). In this case, the master decision controller 128 (or master decision unit) is a dedicated unit that performs the functions of the designated master unit noted above with respect to FIGS. 1 and 3-6.

The makeup of the master decision controller 128 is the same as that for a wireless interface 135, 145, 155, 165 in the embodiment of FIGS. 1 and 2. In particular, the master decision controller 128 includes a processor 210, a memory 220, a wireless transceiver 230, and a bus 240, which operate as described above with respect to FIG. 2.

In this embodiment, the indoor units 121, 122, 123 each act as designated reporting units reporting information to the master decision controller 128, which determines what mode the system 700 should be in (i.e., what mode the outdoor unit 110 should be in), based on the reported information from the indoor units 121, 122, 123, as set forth in FIGS. 3-6. In this case, the master decision controller 128 takes the place of the master indoor unit.

In other words, in this embodiment the configuration operation 320 in FIG. 3 is performed to configure the master decision controller 128 with starting information rather than configuring the designated master unit. Likewise, the reporting of current mode, zone temperature, set point, standby duration, and active duration 420 in FIG. 4 is made to the master decision controller 128 rather than to the designated master unit. Also, the changeover monitoring operation 500 is performed by the master decision controller 128 rather than by the designated master unit.

The embodiment disclosed in FIG. 1 is the specific case of the embodiment of FIG. 7 in which the master decision controller 128 is located within the first indoor unit 121.

Furthermore, the target mode determination operation shown in FIG. 6 may be performed at a server, a cloud, a portable device or any other devices, which are not located the air-conditioning system 100 and connected to the air-conditioning system 100 via the internet. The server, the structure of the cloud, the portable device or any devices has the same as that for a wireless interface 135, 145, 155, 165 in the embodiment of FIGS. 1 and 2.

OTHER ALTERNATE EMBODIMENTS

Although the above air-conditioning system 100 is disclosed as having separate indoor devices 121, 122, 123, 124 linked that make certain communications by a wireless network 190, this is merely by way of example. In alternate embodiments, a similar air-conditioning system could be provided in which individual indoor devices were connected by a wired network, and all communications could be made over the wired network. The operation of configuration, reporting, target mode determination, and changing of the mode of an outdoor unit 110 would remain the same. However, the wireless network 190 would be replaced with a wired network.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A computer-implemented method of controlling an operational mode of an outdoor air-conditioning unit connected to a plurality of indoor air-conditioning units, the method comprising:

determining the operational mode of the outdoor air-conditioning unit;

determining a priority for each of the plurality of indoor air-conditioning units, a maximum standby duration for the plurality of indoor air-conditioning units, and a minimum active duration for the outdoor air-conditioning unit;

providing a master decision unit with the priority for each of the plurality of indoor air-conditioning units, the maximum standby duration for the plurality of indoor air-conditioning units, and the minimum active duration for the outdoor air-conditioning unit;

determining a current area mode, a current area temperature, a set point, and an actual standby duration for each of the plurality of indoor air-conditioning units, and a current active duration for the outdoor air-conditioning unit;

providing the master decision unit with the current area mode, the current area temperature, the set point, and the actual standby duration for each of the plurality of indoor air-conditioning units, and the current active duration for the outdoor air-conditioning unit;

determining a maximum actual standby duration to be equal to a maximum value of the plurality of actual standby durations;

determining, at the master decision unit, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the actual active duration for the outdoor air-conditioning unit; and systematically controlling the operational mode to become the target outdoor mode when the target outdoor mode is different from the operational mode.

2. The method of controlling the operational mode of the outdoor air-conditioning unit, as recited in claim 1, wherein the operation of providing the current area mode, the current area temperature, the set point, and the actual standby duration for each of the plurality of indoor air-conditioning units, and the current active duration for the outdoor air-conditioning unit to the master decision unit is repeated at least every set time period.

3. The method of controlling the operational mode of the outdoor air-conditioning unit, as recited in claim 2, wherein the operation of providing to the master decision unit the current area mode, the current area temperature, the set point, and the actual standby duration for each of the plurality of indoor units, and the current active duration for the outdoor air-conditioning unit is performed whenever at least one of the current area mode, the current area temperature, and the set point for any of the plurality of indoor air-conditioning units changes.

4. The method of controlling the operational mode of the outdoor air-conditioning unit, as recited in claim 1, further comprising:

providing the master decision unit with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the master decision unit with the unique identifier for each respective indoor air-conditioning unit when providing the master decision unit with the current area mode, the current area temperature, the set point, and the actual standby duration for that indoor air-conditioning unit, and the current active duration for the outdoor air-conditioning unit.

5. The method of controlling the operational mode of the outdoor air-conditioning unit, as recited in claim 1, wherein the current area modes for respective indoor air-conditioning units and the operational mode for the outdoor air-conditioning unit can each be either a cooling mode or a heating mode.

6. The method of controlling the operational mode of the outdoor air-conditioning unit, as recited in claim 1, further comprising:

determining a unit request value for each of the respective indoor air-conditioning units, each respective unit request value being equal to a sum or product of a first scaling factor multiplied by the priority of the respective indoor air-conditioning unit, and a second scaling factor multiplied by a temperature differential for the respective indoor air-conditioning unit;

determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and the active mode is equal to the operational mode, and the inactive mode is equal to a mode other than the operational mode.

7. The method of controlling the operational mode of the outdoor air-conditioning unit, as recited in claim 6, wherein when the current active duration for the outdoor air-conditioning unit is less than the minimum active duration, the target outdoor mode is set to be the active mode;

when the current active duration for the outdoor air-conditioning unit greater than or equal to the minimum active duration and the maximum actual standby duration is greater than the maximum allowed standby duration, the target mode is set to be the inactive mode;

when the current active duration for the outdoor air-conditioning unit greater than or equal to the minimum active duration, the maximum actual standby duration is less than or equal to the maximum allowed standby duration, and the inactive request value is greater than the active request value, the target mode is set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode is set to be the active mode.

8. A non-transitory computer-readable medium comprising instructions for execution by a computer, the instructions including a computer-implemented method for a master decision unit to control an operational mode of an outdoor air-conditioning unit connected to a plurality of indoor air-conditioning, the instructions for implementing:

determining the operational mode of the outdoor air-conditioning unit;

determining a priority for each of the plurality of indoor air-conditioning units, a maximum standby duration for the plurality of indoor air-conditioning units, and a minimum active duration for the outdoor air-conditioning unit;

providing the master decision unit with the priority for each of the plurality of indoor air-conditioning units, the maximum standby duration for the plurality of indoor air-conditioning units, and the minimum active duration for the outdoor air-conditioning unit;

determining a current area mode, a current area temperature, a set point, and an actual standby duration for each of the plurality of indoor air-conditioning units, and a current active duration for the outdoor air-conditioning unit;

providing the master decision unit with the current area mode, the current area temperature, the set point, and the actual standby duration for each of the plurality of indoor air-conditioning units, and the current active duration for the outdoor air-conditioning unit;

determining a maximum actual standby duration to be equal to a maximum value of the plurality of actual standby durations;

determining, at the master decision unit, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and systematically controlling the operational mode to become the target outdoor mode when the target outdoor mode is different from the operational mode.

9. The non-transitory computer-readable medium, as recited in claim 8, wherein the operation of providing the current area mode, the current area temperature, the set point, and the actual standby duration for each of the plurality of indoor air-conditioning units, and the current active duration for the outdoor air-conditioning unit to the master decision unit is repeated at least every set time period.

10. The non-transitory computer-readable medium, as recited in claim 9, wherein the operation of providing to the master decision unit the current area mode, the current area temperature, the set point, and the actual standby duration for each of the plurality of indoor air-conditioning units, and the current active duration for the outdoor air-conditioning unit is performed whenever at least one of the current area mode, the current area temperature, and the set point for any of the plurality of indoor air-conditioning units changes.

11. The non-transitory computer-readable medium, as recited in claim 8, further comprising instructions for:

providing the master decision unit with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the master decision unit with the unique identifier for each respective indoor air-conditioning unit when providing the master decision unit with the current area mode, the current area temperature, the set point, and the actual standby duration for that indoor dear-conditioning unit, and the current active duration for the outdoor air-conditioning unit.

12. The non-transitory computer-readable medium, as recited in claim 8, wherein the current area modes for respective indoor air-conditioning units and the operational mode for the outdoor air-conditioning unit can each be either a cooling mode or a heating mode.

13. The non-transitory computer-readable medium, as recited in claim 8, further comprising instructions for:

determining a unit request value for each of the respective indoor air-conditioning units, each respective unit request value being equal to a sum or a product of a first scaling factor multiplied by the priority of the respective indoor air-conditioning unit, and a second scaling factor multiplied by a temperature differential for the respective indoor air-conditioning unit;

determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and the active mode is equal to the operational mode, and the inactive mode is equal to a mode other than the operational mode.

14. The non-transitory computer-readable medium, as recited in claim 13, wherein when the current active duration for the outdoor air-conditioning unit is less than the minimum active duration, the target outdoor mode is set to be the active mode;

when the current active duration for the outdoor air-conditioning unit greater than or equal to the minimum active duration and the maximum actual standby duration is greater than the maximum allowed standby duration, the target mode is set to be the inactive mode;

when the current active duration for the outdoor air-conditioning unit greater than or equal to the minimum active duration, the maximum actual standby duration is less than or equal to the maximum allowed standby duration, and the inactive request value is greater than the active request value, the target mode is set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode is set to be the active mode.

15. A computer system configured for controlling an operational mode of an outdoor air-conditioning unit connected to a plurality of indoor air-conditioning units, the system comprising:

a transceiver operable to transmit and receive communications over at least a portion of a network;

a memory configured to store data and instructions; and a processor cooperatively operable with the transceiver and the memory, and configured to facilitate:

determining the operational mode of the outdoor air-conditioning unit;

determining a priority for each of the plurality of indoor air-conditioning units, a maximum standby duration for the plurality of indoor air-conditioning units, and a minimum active duration for the outdoor air-conditioning unit;

providing the processor with the priority for each of the plurality of indoor air-conditioning units, the maximum standby duration for the plurality of indoor air-conditioning units, and the minimum active duration for the outdoor air-conditioning unit;

determining a current area mode, a current area temperature, a set point, and an actual standby duration for each of the plurality of indoor air-conditioning units, and a current active duration for the outdoor air-conditioning unit;

providing the processor with the current area mode, the current area temperature, the set point, and the actual standby duration for each of the plurality of indoor air-conditioning units, and the current active duration for the outdoor air-conditioning unit;

determining a maximum actual standby duration to be equal to a maximum value of the plurality of actual standby durations;

determining, at the processor, a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and systematically controlling the operational mode to become the target outdoor mode when the target outdoor mode is different from the operational mode.

16. The computer system, as recited in claim 15, wherein the operation of providing the current area mode, the current area temperature, the set point, and the actual standby duration for each of the plurality of indoor air-conditioning units, and the current active duration for the outdoor air-conditioning unit to the processor is repeated at least every set time period.

17. The computer system, as recited in claim 16, wherein the operation of providing to the processor the current area mode, the current area temperature, the set point, and the actual standby duration for each of the plurality of indoor air-conditioning units, and the current active duration for the outdoor air-conditioning unit is performed whenever at least one of the current area mode, the current area temperature, and the set point for any of the plurality of indoor air-conditioning units changes.

18. The computer system, as recited in claim 15, wherein the processor cooperatively operable with the transceiver and the memory may be further configured to facilitate:

providing the processor with unique identifiers for each of the plurality of indoor air-conditioning units prior to determining the current area mode, the current area temperature, the set point, and the actual standby duration for each of the plurality of indoor air-conditioning units, and the current active duration for the outdoor air-conditioning unit; and providing the processor with the unique identifier for each respective indoor air-conditioning unit when providing the processor with the current area mode, the current area temperature, the set point, and the actual standby duration for that indoor air-conditioning unit, and the current active duration for the outdoor air-conditioning unit.

19. The computer system, as recited in claim 15, wherein the processor cooperatively operable with the transceiver and the memory may be further configured to facilitate:

determining a unit request value for each of the respective indoor air-conditioning units, each respective unit request value being equal to a sum or product of a first scaling factor multiplied by the priority of the respective indoor air-conditioning unit, and a second scaling factor multiplied by a temperature differential for the respective indoor air-conditioning unit;

determining an active request value to be equal to a sum of the unit request values for each indoor air-conditioning unit that is in an active mode; and determining an inactive request value to be equal to a sum of the unit request values for each indoor air-conditioning unit that is in an inactive mode, wherein the temperature differential for each respective indoor air-conditioning unit is equal to the set point for the respective indoor air-conditioning unit minus the current room temperature associated with the respective indoor air-conditioning unit, and the active mode is equal to the operational mode, and the inactive mode is equal to a mode other than the operational mode.

20. The computer system, as recited in claim 19, wherein when the current active duration for the outdoor air-conditioning unit is less than the minimum active duration, the target outdoor mode is set to be the active mode;

when the current active duration for the outdoor air-conditioning unit greater than or equal to the minimum active duration and the maximum actual standby duration is greater than the maximum allowed standby duration, the target mode is set to be the inactive mode;

when the current active duration for the outdoor air-conditioning unit greater than or equal to the minimum active duration, the maximum actual standby duration is less than or equal to the maximum allowed standby duration, and the inactive request value is greater than the active request value, the target mode is set to be the inactive mode; and when the current active duration for the outdoor air-conditioning unit greater than or equal to the minimum active duration, the maximum actual standby duration is less than or equal to the maximum allowed standby duration, and the inactive request value is less than or equal to the active request value, the target mode is set to be the active mode.

21. A system configured for controlling an operational mode of an outdoor air-conditioning unit connected to a plurality of indoor air-conditioning units, the system comprising:

a transceiver operable configured to transmit and receive communications over at least a portion of a network;

a memory configured to store data and instructions; and a processor cooperatively operable with the transceiver and the memory, and configured to facilitate:

obtaining the operational mode of the outdoor air-conditioning unit;

obtaining a priority for each of the plurality of indoor air-conditioning units, a maximum standby duration for the plurality of indoor air-conditioning units, and a minimum active duration for the outdoor air-conditioning unit;

obtaining a current area mode, a current area temperature, a set point, and an actual standby duration for each of the plurality of indoor air-conditioning units, and a current active duration for the outdoor air-conditioning unit;

obtaining a maximum actual standby duration to be equal to a maximum value of the plurality of actual standby durations;

determining a target outdoor mode for the outdoor air-conditioning unit based on the priority, the current area mode, the current area temperature, and the set point for each of the plurality of indoor air-conditioning units, the maximum actual standby duration and the maximum allowable standby duration of the plurality of indoor air-conditioning units, and the minimum active duration and the current active duration for the outdoor air-conditioning unit; and controlling the operational mode to become the target outdoor mode when the target outdoor mode is different from the operational mode.

\* \* \* \* \*